US011966809B2

(12) United States Patent
Barkan et al.

(10) Patent No.: US 11,966,809 B2
(45) Date of Patent: Apr. 23, 2024

(54) SYNCHRONIZING ROLLING SHUTTER AND GLOBAL SHUTTER SENSORS

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/828,853

(22) Filed: May 31, 2022

(65) Prior Publication Data

US 2023/0385572 A1    Nov. 30, 2023

(51) Int. Cl.
*G06K 7/10* (2006.01)
*G06K 7/14* (2006.01)

(52) U.S. Cl.
CPC ....... *G06K 7/10554* (2013.01); *G06K 7/1413* (2013.01)

(58) Field of Classification Search
CPC ........... G06K 7/10722; G06K 7/10752; G06K 7/1413
USPC ........................... 235/462.41, 462.32, 462.11
See application file for complete search history.

(56) References Cited

U.S. PATENT DOCUMENTS

| 7,568,628 B2 * | 8/2009 | Wang ................... H04N 23/667 235/462.07 |
| 8,453,933 B1 * | 6/2013 | Pang .................. G06K 7/10554 235/462.25 |
| 2009/0078775 A1 * | 3/2009 | Giebel ................. G06K 7/0004 235/462.41 |
| 2009/0084847 A1 | 4/2009 | He et al. |
| 2010/0252635 A1 * | 10/2010 | Drzymala .......... G06K 7/10722 235/462.41 |
| 2016/0078266 A1 * | 3/2016 | Liu ..................... G06K 7/10881 235/462.41 |
| 2017/0293785 A1 * | 10/2017 | Handshaw .......... G06K 7/1413 |
| 2022/0331841 A1 | 10/2022 | Filler et al. |

FOREIGN PATENT DOCUMENTS

WO    2016/178712 A1    11/2016

* cited by examiner

*Primary Examiner* — Paultep Savusdiphol
(74) *Attorney, Agent, or Firm* — Yuri Astvatsaturov

(57) ABSTRACT

An imaging system for synchronizing rolling shutter and global shutter sensors is disclosed herein. An example imaging system includes an illumination source configured to emit illumination lasting a predetermined period, a first imaging sensor, and a second imaging sensor. The first imaging sensor is configured to capture first image data representative of an environment appearing within a field of view (FOV) of the first imaging sensor during a first period that overlaps at least partially with the predetermined period, and the first imaging sensor operates as a global shutter imaging sensor. The second imaging sensor is configured to capture second image data representative of an environment appearing within a FOV of the second imaging sensor during a second period that overlaps at least partially with the predetermined period and is different from the first period, and the second imaging sensor operates as a rolling shutter imaging sensor.

20 Claims, 10 Drawing Sheets

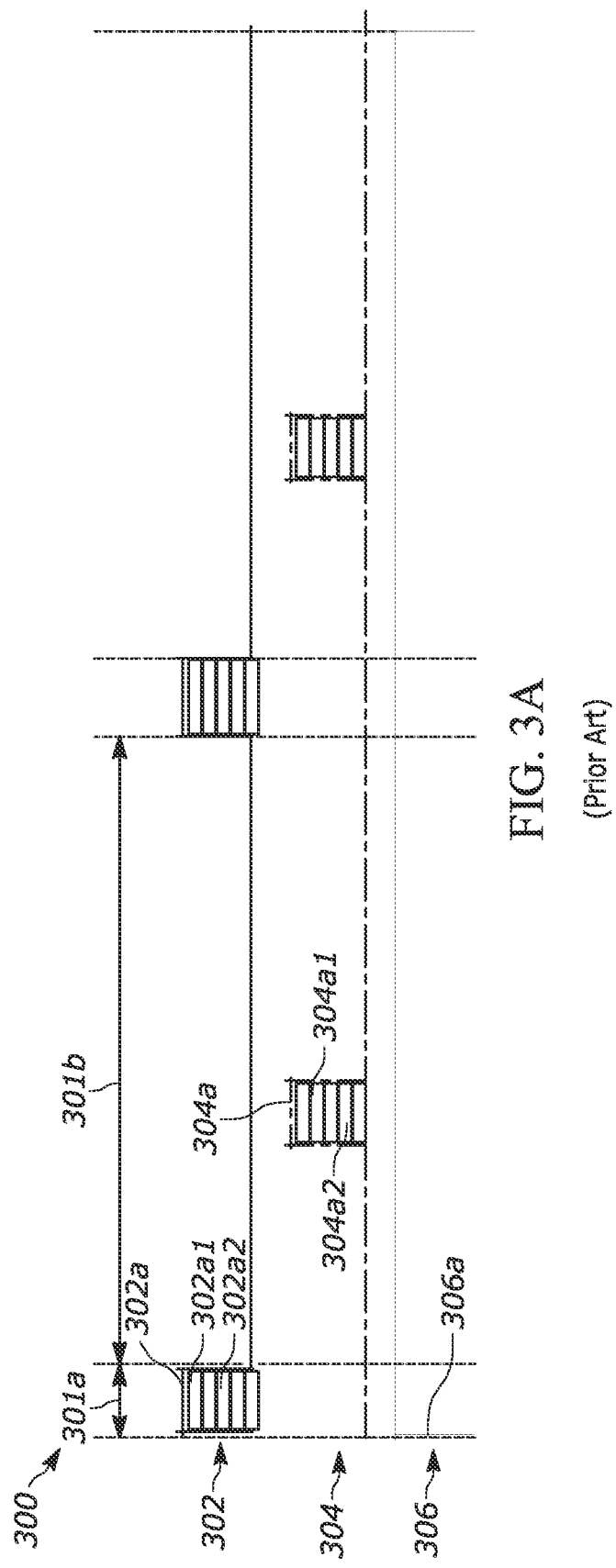

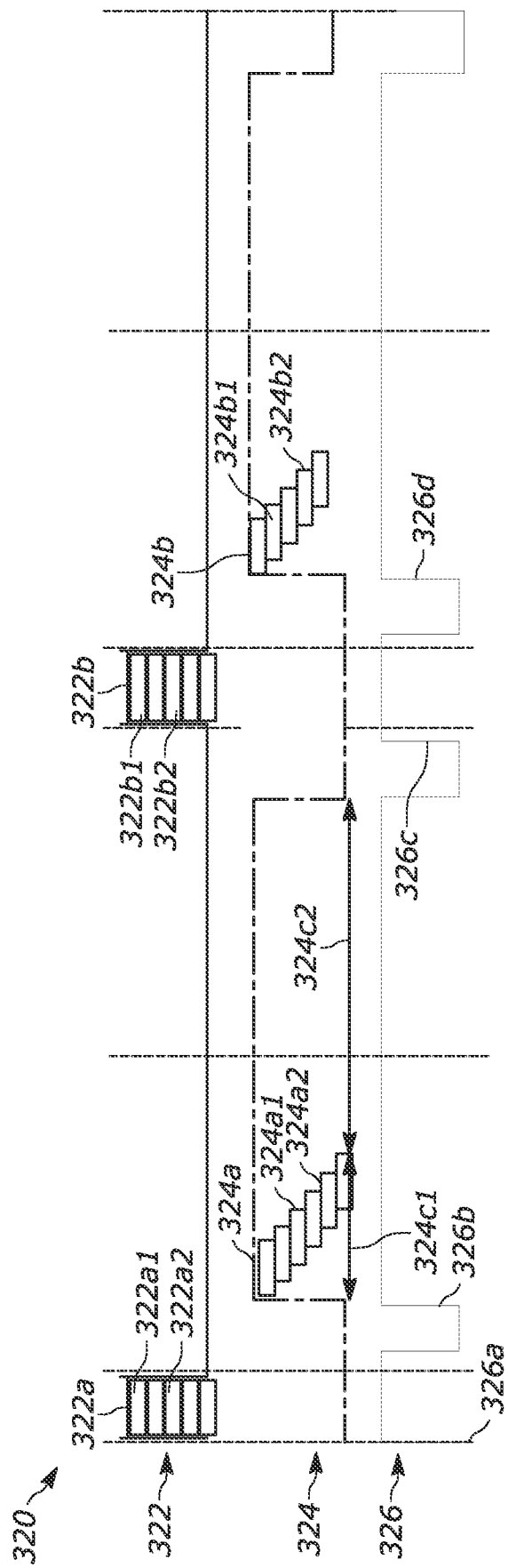

SYNCHRONIZING ROLLING SHUTTER AND GLOBAL SHUTTER SENSORS

BACKGROUND

Barcode scanning devices that include visual imaging systems are commonly utilized in many retail and other locations. Such devices typically include multiple global imaging shutters to expose imaging sensors for the barcode scanning function and the visual imaging function. However, this double global shutter configuration increases the complexity and cost of such devices as each global shutter requires an external imaging processor. This conventional configuration also inherently limits the effectiveness of emitted illumination from an illumination source because the global shutters combined exposure period is only a fraction of the period during which the illumination is present. Consequently, conventional barcode scanning devices that include visual imaging systems suffer from multiple issues that cause such conventional devices to operate non-optimally for functions such as object recognition.

Accordingly, there is a need for barcode scanning devices with visual imaging systems that synchronize rolling shutter and global shutter sensors in order to optimize the performance of the barcode scanning and visual imaging functions relative to conventional devices.

SUMMARY

Generally speaking, the imaging systems herein utilize multiple imaging sensors and an illumination source to capture image data using illumination from the illumination source. In particular, the first imaging sensor may operate as a global shutter imaging sensor that is configured to expose all photosites simultaneously and/or nearly simultaneously to capture image data, and the second imaging sensor may operate as a rolling shutter imaging sensor that is configured to expose individual rows/columns of photosites sequentially to capture image data. The imaging sensors may be configured to capture image data during a predetermined period, and the periods within the predetermined period during which the respective imaging sensors capture image data may be different.

Accordingly, in an embodiment, the present invention is an imaging system for reading and/or decoding indicia. The imaging system comprises: an illumination source configured to emit illumination lasting a predetermined period; a first imaging sensor configured to capture first image data representative of an environment appearing within a field of view (FOV) of the first imaging sensor during a first period that overlaps at least partially with the predetermined period, the first imaging sensor operating as a global shutter imaging sensor; and a second imaging sensor configured to capture second image data representative of an environment appearing within a FOV of the second imaging sensor during a second period that overlaps at least partially with the predetermined period and is different from the first period, the second imaging sensor operating as a rolling shutter imaging sensor.

In a variation of this embodiment, an initial exposure of the first imaging sensor is within 2 milliseconds (ms) of a beginning of the predetermined period, and an initial exposure of the second imaging sensor is within 2 ms of an end of the first period.

In another variation of this embodiment, a first sensor readout period of the first imaging sensor and a second sensor readout period of the second imaging sensor take place at least partially within the predetermined period.

In yet another variation of this embodiment, a beginning of a subsequent image data capture of the first imaging sensor is within 2 milliseconds (ms) of an end of the second period.

In yet another variation of this embodiment, the imaging system further comprises: a first imaging apparatus that includes the first imaging sensor, and wherein, responsive to the second period ending at least partially outside of the predetermined period, the first imaging apparatus receives a delay signal to delay exposure of the first imaging sensor until the second imaging sensor is not exposed.

In still another variation of this embodiment, the second imaging sensor is further configured to capture subsequent image data representative of the environment appearing within the FOV of the second imaging sensor during a subsequent period that is different from the second period, the second imaging sensor operating as a global shutter imaging sensor during the subsequent period.

In yet another variation of this embodiment, the second period at least partially overlaps with the first period.

In still another variation of this embodiment, the second period corresponds with a central period of the predetermined period that does not include the first period.

In yet another variation of this embodiment, the first period begins within 2 milliseconds (ms) of the second period, and image data captured by a set of initially exposed sensor rows of the second imaging sensor is discarded during a second imaging sensor readout period within the predetermined period.

In still another variation of this embodiment, the first period begins within 2 milliseconds (ms) of the second period, the FOV of the second imaging sensor is larger than the FOV of the first imaging sensor, and a portion of the emitted illumination is clipped to avoid illuminating a set of initially exposed sensor rows of the second imaging sensor that are along an edge of the FOV of the second imaging sensor.

In yet another variation of this embodiment, the first period begins within 2 milliseconds (ms) of an end of the second period, the FOV of the second imaging sensor is larger than the FOV of the first imaging sensor, and a portion of the emitted illumination is clipped to avoid illuminating a set of finally exposed sensor rows of the second imaging sensor that are along an edge of the FOV of the second imaging sensor.

In another embodiment, the present invention is a tangible machine-readable medium comprising instructions for reading and/or decoding indicia that, when executed, cause a machine to at least: emit illumination lasting a predetermined period; expose a first imaging sensor for a first period that overlaps at least partially with the predetermined period, the first imaging sensor operating as a global shutter imaging sensor; capture, by the first imaging sensor, first image data representative of an environment appearing within a field of view (FOV) of the first imaging sensor during the first period; expose a second imaging sensor for a second period that overlaps at least partially with the predetermined period and is different from the first period, the second imaging sensor operating as a rolling shutter imaging sensor; and capture, by the second imaging sensor, second image data representative of an environment appearing within a FOV of the second imaging sensor.

In a variation of this embodiment, the instructions, when executed, further cause the machine to at least: begin exposing the first imaging sensor within 2 milliseconds (ms) of a beginning of the predetermined period; and begin exposing the second imaging sensor within 2 ms of an end of the first period.

In another variation of this embodiment, the instructions, when executed, further cause the machine to at least: cause a first sensor readout period of the first imaging sensor and a second sensor readout period of the second sensor to take place at least partially within the predetermined period.

In yet another variation of this embodiment, the instructions, when executed, further cause the machine to at least: begin capturing, by the first imaging sensor, subsequent image data within 2 milliseconds (ms) of an end of the second period.

In still another variation of this embodiment, the instructions, when executed, further cause the machine to at least: responsive to the second period ending at least partially outside of the predetermined period, delay exposure of the first imaging sensor until the second imaging sensor is not exposed.

In yet another variation of this embodiment, the instructions, when executed, further cause the machine to at least: cause the second imaging sensor to capture subsequent image data representative of the environment appearing within the FOV of the second imaging sensor during a subsequent period that is different from the second period, the second imaging sensor operating as a global shutter imaging sensor during the subsequent period.

In still another variation of this embodiment, the instructions, when executed, further cause the machine to at least: expose the second imaging sensor at least partially during the first period, such that the second period at least partially overlaps with the first period.

In yet another variation of this embodiment, the instructions, when executed, further cause the machine to at least: expose the second imaging sensor such that the second period corresponds with a central period of the predetermined period that does not include the first period.

In still another variation of this embodiment, the instructions, when executed, further cause the machine to at least: cause the first period to begin within 2 milliseconds (ms) of the second period; and discard image data captured by a set of initially exposed sensor rows of the second imaging sensor during a second sensor readout period within the predetermined period.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3A is a graph illustrating a prior art activation sequence of multiple image sensors in a prior art barcode reader.

FIG. 3C is a graph illustrating a second exemplary activation sequence of the illumination source, the first imaging sensor, and the second imaging sensor, in accordance with embodiments disclosed herein.

Figure 1:
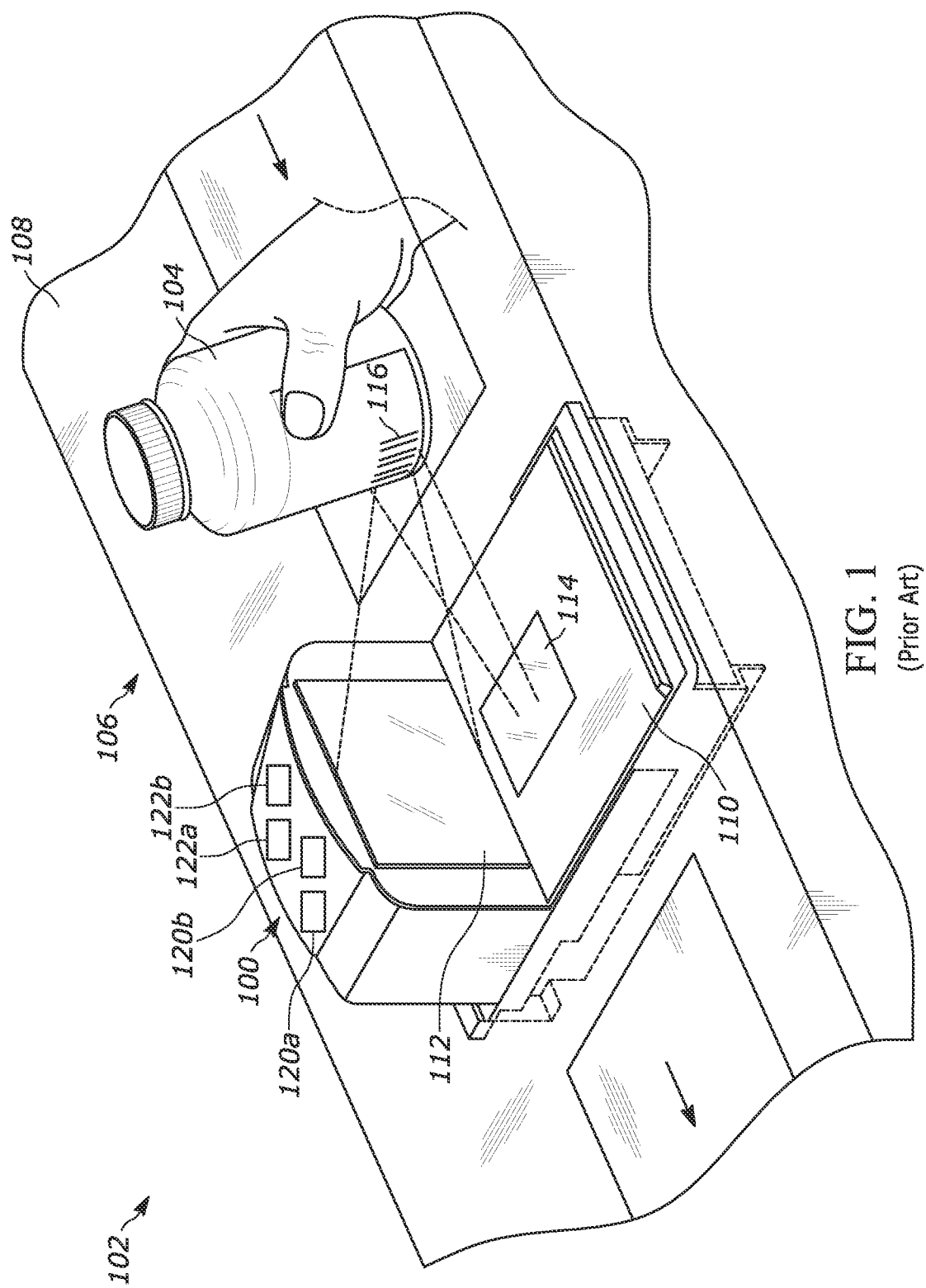
FIG. 1 is a perspective view of a prior art bioptic barcode reader, implemented in a prior art point-of-sale (POS) system, showing capture of an image of a target object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 is a perspective view of a prior art bioptic barcode reader 100, implemented in a prior art point-of-sale (POS) system 102, showing capture of an image of a target object 104 being swiped across the bioptic barcode reader 100 scanning area. The POS system 102 includes a workstation 106 with a counter 108, and the bioptic barcode reader 100. The bioptic barcode reader 100 includes a weighing platter 110, which may be a removable or a non-removable. Typically, a customer or store clerk will pass the target object 104 across at least one of a substantially vertical imaging window 112 or a substantially horizontal imaging window 114 to enable the bioptic barcode reader 100 to capture one or more images of the target object 104, including the barcode 116.

As part of the clerk passing the target object 104 across the imaging windows 112, 114, the bioptic barcode reader 100 may trigger illumination sources 120a, 120b included in the reader 100 to emit illumination, and for one or more imaging sensors 122a, 122b to capture image data of the target object 104 and/or the barcode 116. The illumination sources 120a, 120b may emit different illumination (e.g., white light, red light, etc.) depending on the imaging sensor currently configured to capture image data. Moreover, the imaging sensors 120a, 120b may both operate as global shutter imaging sensors when the respective illumination source 122a, 122b emits illumination for the respective imaging sensor 120a, 120b.

For example, a first illumination source 120a may emit red light to illuminate the target object 104 when a barcode scanning sensor 122a is activated to capture image data, and a second illumination source 120b may emit white light to illuminate the target object 104 when a visual imaging sensor 122b is activated to capture image data. When the first illumination source 120a emits the red light illumination, the second illumination source 120b may not emit white light illumination, and the visual imaging sensor 122b may not capture image data. Conversely, when the second illumination source 120b emits white light illumination, the first illumination source 120a may not emit the red light illumination, and the barcode scanning sensor 122a may not capture image data.

More specifically, the first illumination source 120a may include multiple red light emitting diodes (LEDs) on each side of the barcode scanning sensor 122a, and the second illumination source 120b may include multiple white LEDs on each side of the visual imaging sensor 122b. When a clerk or customer passes the target object 104 in front of either scanning window 112, 114, the bioptic barcode reader 100 may activate the first illumination source 120a to emit red light illumination, and the reader 100 may activate the barcode scanning sensor 122a to capture image data of the barcode 116. Once the barcode scanning sensor 122a has captured image data of the barcode 116, the reader 100 may deactivate the first illumination source 120a and may activate the second illumination source 120b to emit white light illumination. Accordingly, the reader 100 may also activate the visual imaging sensor 122b to capture image data of the target object 104 using the white light illumination from the second illumination source 120b.

However, as previously mentioned, this conventional activation sequence involving multiple global shutter imaging sensors (e.g., imaging sensors 120a, 120b) yields several undesirable results. Namely, conventional devices similar to the prior art bioptic barcode reader 100 suffer from increased complexity and cost as each global shutter imaging sensor requires an external imaging processor. This conventional configuration also inherently limits the effectiveness of emitted illumination from the illumination sources (e.g., illumination sources 122a, 122b) because the combined exposure period of the global shutter imaging sensors (120a, 120b) is only a fraction of the period during which the illumination is present. Moreover, the prior art bioptic barcode reader 100 also suffers from less effective imaging tasks, such as object recognition, that typically benefit from the additional sharpness yielded from longer exposure times than global shutter imaging sensors utilize.

More specifically, conventional devices suffer from requiring multiple global shutter imaging sensors due to the contrasting imaging requirements and corresponding end goals of barcode scanners and visual imagers. Barcode imagers typically include monochromatic sensors configured to operate with relatively short exposure periods that freeze an indicia in place during image capture (e.g., minimizing blur) without sacrificing a sufficiently high number of pixels per module (PPM) in order to accurately decode the indicia payload. On the other hand, visual imagers typically include color sensors configured to operate with relatively longer exposure periods in order to acquire sufficient color data and brightness to perform accurate image analysis that does not necessarily require negligible image blur. Thus, these differences result in at least the visual imaging tasks suffering from the use of global shutter imaging sensors, as such shutters can fail to capture images with sufficient quality in order to perform many of the visual imaging tasks.

However, to resolve these issues with conventional devices, the imaging systems of the present disclosure provide a first imaging sensor that operates as a global shutter imaging sensor and a second imaging sensor that operates as a rolling shutter imaging sensor, such that the imaging systems of the present disclosure are suitable for barcode decoding as well as visual image analysis.

Figure 2A:
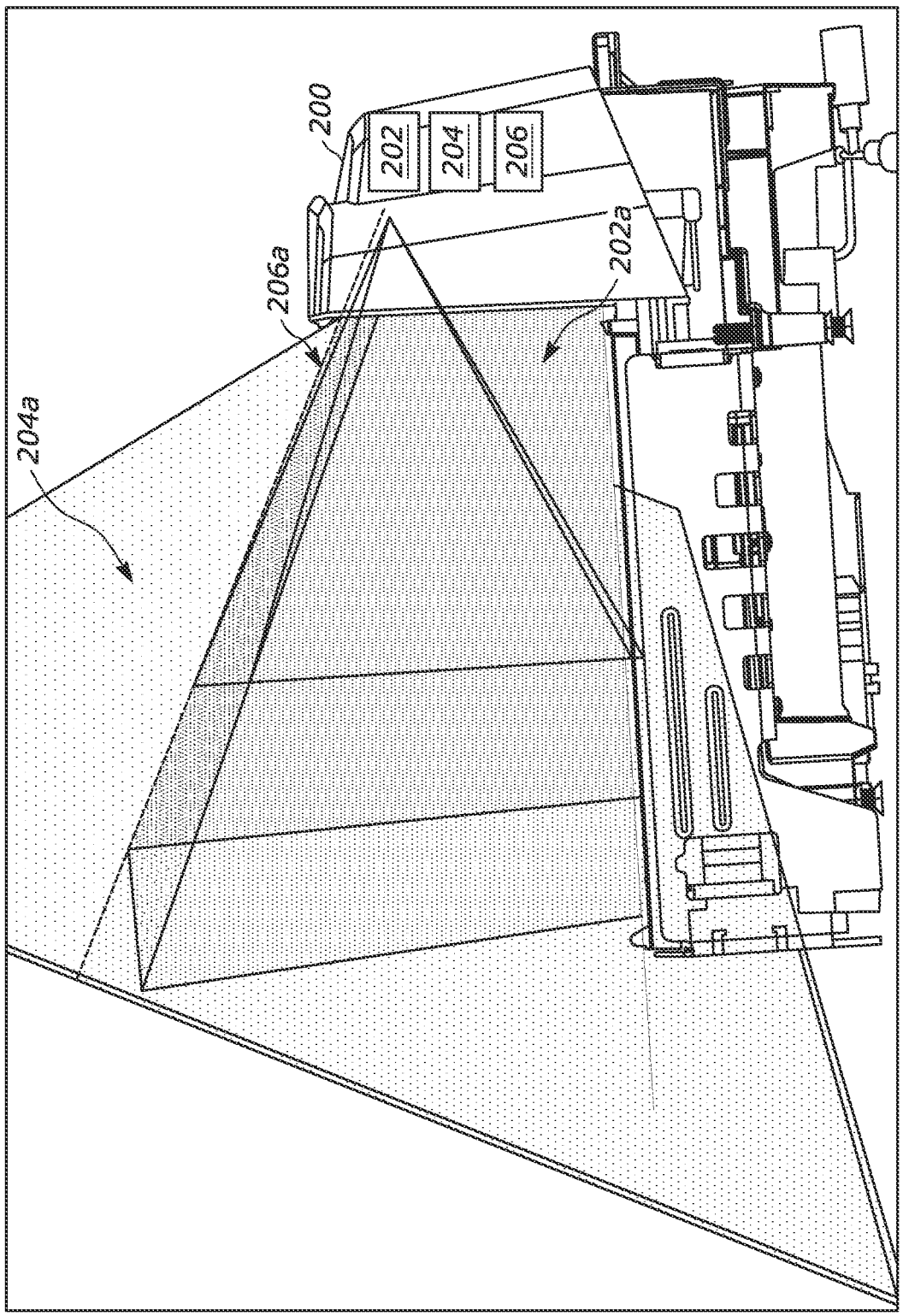
FIG. 2A illustrates a profile view of an example imaging system that includes a first imaging apparatus, a second imaging apparatus, and an illumination source, in accordance with embodiments disclosed herein.

To illustrate, FIG. 2A provides a profile view of an example imaging system 200 that includes a first imaging apparatus 202, a second imaging apparatus 204, and an illumination source 206, in accordance with embodiments disclosed herein. The example imaging system 200 may be any suitable type of imaging device, such as a bioptic barcode scanner, a slot scanner, an original equipment manufacturer (OEM) scanner inside of a kiosk, a handle/handheld scanner, and/or any other suitable imaging device type. For ease of discussion only, the example imaging system 200 may be described herein as a vertical imaging tower of a bioptic barcode scanner.

Generally speaking, the first imaging apparatus 202 may be a barcode scanner with one or more barcode imaging sensors that operate as global shutter imaging sensors and that are configured to capture image data representative of an environment appearing within a field of view (FOV) 202a of the first imaging apparatus 202, such as one or more images of an indicia associated with the target object. The second imaging apparatus 204 may be visual imager (also referenced herein as a "vision camera") with one or more visual imaging sensors that operate as rolling shutter imaging sensors and that are configured to capture image data representative of an environment appearing within a FOV 204a of the second imaging apparatus 204, such as one or more images of a target object.

The illumination source 206 may generally be configured to emit an illumination pulse that provides illumination during a predetermined period. The first imaging apparatus 202 and the second imaging apparatus 204 may be configured to capture image data during the predetermined period, thereby utilizing at least some of the same illumination provided by the illumination pulse emitted from the illumination source 206. In some embodiments, the first imaging apparatus 202 and the second imaging apparatus 204 may use and/or include color sensors and the illumination source 206 may emit white light illumination via the illumination pulse. Additionally, or alternatively, the second imaging apparatus 204 may use and/or include a monochrome sensor configured to capture image data of an indicia associated with the target object in a particular wavelength or wavelength range (e.g., 600 nanometers (nm)-700 nm).

Figure 2B:
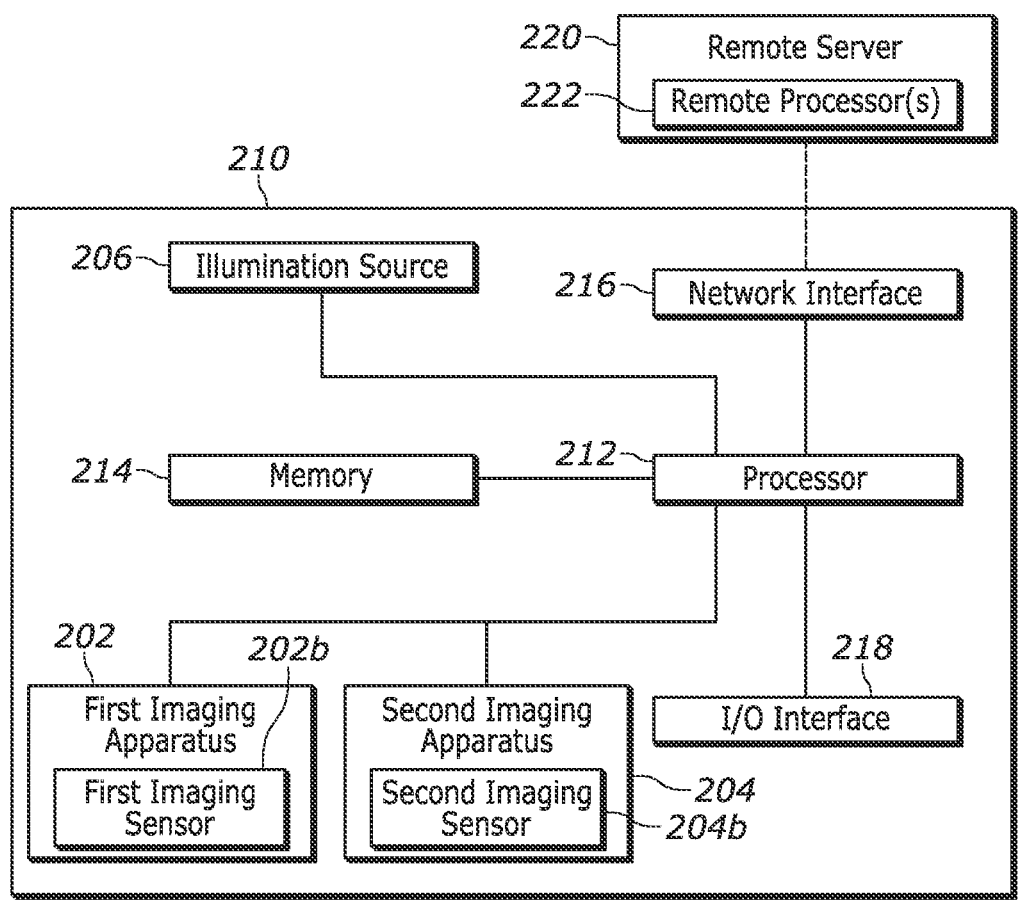
FIG. 2B is a block diagram of an example logic circuit for implementing example methods and/or operations described herein.

More specifically, the first imaging apparatus 202 and the second imaging apparatus 204 may each include subcomponents, such as one or more imaging sensors (e.g., first imaging sensor 202b, second imaging sensor 204b in FIG. 2B) and/or one or more imaging shutters (not shown) that are configured to enable the imaging apparatuses 202, 204 to capture image data corresponding to, for example, a target object and/or an indicia associated with the target object. It should be appreciated that the imaging shutters included as part of the imaging apparatuses 202, 204 may be electronic and/or mechanical shutters configured to expose/shield the imaging sensors of the apparatuses 202, 204 from the external environment. In particular, the imaging shutters that may be included as part of the imaging apparatuses 202, 204 may function as electronic shutters that clear photosites of the imaging sensors at a beginning of an exposure period of the respective sensors.

Regardless, such image data may comprise 1-dimensional (1D) and/or 2-dimensional (2D) images of a target object, including, for example, packages, products, or other target objects that may or may not include barcodes, QR codes, or other such labels for identifying such packages, products, or other target objects, which may be, in some examples, merchandise available at retail/wholesale store, facility, or the like. A processor (e.g., processor 212 of FIG. 2B) of the example imaging system 200 may thereafter analyze the image data of target objects and/or indicia passing through a scanning area or scan volume of the example imaging system 200.

The first imaging apparatus 202 may have a first field of view (FOV) 202a, and the second imaging apparatus 204 may have a second FOV 204a that at least partially overlaps the first FOV 202a. As illustrated in FIG. 2A, the first FOV 202a and the second FOV 204a may include different portions of the external environment of the example imaging system 200. For example, the second FOV 204a may extend above/below the first FOV 202a, and as a result, the second imaging apparatus 204 may capture image data of a portion of the external environment that the first imaging apparatus 202 may not capture. Of course, it will be appreciated that the FOV 202a, 204a of the respective imaging apparatuses 202, 204 may be of any suitable size and provide any suitable coverage to facilitate the functionalities described herein.

These differences in the FOVs 202a, 204a may be benefit the respective imaging apparatuses 202, 204. Namely, the first FOV 202a may be oriented and sized such that the images captured by the first imaging apparatus 202 have sufficient resolution to successfully decode barcodes and/or other indicia (e.g., quick response (QR) codes, etc.) included in the image data. Similarly, the second FOV 204a may be oriented and sized appropriately to optimize the captured images for a vision application performed by the example imaging system 200. For example, the second imaging apparatus 204 may capture images that are intended to be utilized by the example imaging system 200 for at least one of: (i) facial recognition, (ii) scan avoidance detection, (iii) ticket switching detection, (iv) item recognition, or (v) video feed analysis.

Typically, the second FOV 204a may be larger than the first FOV 202a because the second imaging apparatus 204 may not require the same level of resolution in captured images as the first imaging apparatus 202. In particular, unlike the image data captured by the first imaging apparatus 202, the image data captured by the second imaging apparatus 204 is not typically evaluated for decoding of indicia. Thus, as an example, the second FOV 204a may be or include a relatively large region of the external environment in order to acquire enough visual data that would enable the example imaging system 200 to perform scan avoidance detection (e.g., clerk or customer pretending to scan an item without actually passing the indicia associated with the item across the scanning windows or FOVs). As another example, the second FOV 204a may be relatively large to enable the example imaging system 200 to perform product identification for large items or to enable multiple different focuses depending on the item of interest.

As mentioned, the illumination source 206 may generally emit illumination pulses within a wavelength range generally corresponding to white light illumination. For example, each illumination pulse may include light within a wavelength range generally extending from about 400 nm to about 700 nm. Generally, as previously mentioned, the illumination source 206 may emit an illumination pulse, and the illumination pulse may last for a predefined period. During the predefined period, both the first imaging apparatus 202 and the second imaging apparatus 204 may proceed to capture image data corresponding to the target object and/or the indicia associated with the target object. Thus, the imaging shutters for both the first imaging apparatus 202 and the second imaging apparatus 204 may be configured to expose the first imaging apparatus 202 and the second imaging apparatus 204 while an illumination pulse provides illumination defining a single predefined period.

As an example, a clerk may bring a target object into the FOVs 202a, 204a of the imaging apparatuses 202, 204, and the example imaging system 200 may cause the illumination source 206 to emit an illumination pulse, thereby providing illumination lasting a predefined period. The imaging shutter of the second imaging apparatus 204 may expose the imaging sensors of the second imaging apparatus 204 (e.g., clear photosites of the second imaging sensor) when the illumination source 206 emits the illumination pulse in order for the second imaging apparatus 204 to capture image data corresponding to, for example, the target object within the FOV 204a. In certain instances, the imaging shutter of the second imaging apparatus 204 may, for example, expose the imaging sensors of the second imaging apparatus 204 slightly after the illumination source 206 emits the illumination pulse, but while the illumination pulse continues to provide illumination sufficient to enable the second imaging apparatus 204 to capture image data.

Further, the imaging shutter of the first imaging apparatus 202 may expose the imaging sensors of the first imaging apparatus 202 (e.g., clear photosites of the first imaging sensor) nearly simultaneously with the illumination source 206 emitting the illumination pulse. Moreover, both imaging apparatuses 202, 204 may conclude respective exposures within the predetermined period, such that the image data captured by both apparatuses 202, 204 received constant illumination from the single illumination pulse. In this manner, both imaging apparatuses 202, 204 may capture image data during the image capture duration using the illumination provided by a single illumination pulse emitted from the illumination source 206.

In certain embodiments, the duration of the predetermined period may be based on the exposure period requirements of the respective apparatuses 202, 204. For example, the first imaging apparatus 202 may have a relatively short exposure requirement in order to achieve the necessary resolution for decoding an indicia associated with a target object. By contrast, the second imaging apparatus 204 may have a relatively long exposure requirement in order to achieve the necessary color and brightness to perform object recognition and/or other visual analysis tasks (e.g., facial recognition, scan avoidance detection, ticket switching detection, item recognition, video feed analysis, etc.). Thus, in these embodiments, the predetermined period may be long enough such that the exposure period of the second imaging apparatus 204 may fit entirely within the predetermined period.

Additionally, or alternatively, the illumination source 206 may emit individual illumination pulses for each imaging apparatus 202, 204, and the individual illumination pulses may define predetermined periods of different lengths based on the exposure periods of the respective imaging apparatuses 202, 204. For example, the illumination source 206 may emit a first illumination pulse that provides illumination lasting a first predetermined period, and the imaging shutter for the first imaging apparatus 202 may expose the first imaging sensors of the first imaging apparatus 202 during the first predetermined period to capture image data corresponding to an indicia associated with a target object. When the first illumination pulse stops providing illumination, the illumination source 206 may emit a second illumination pulse that provides illumination lasting a second predetermined period, and the imaging shutter for the second imaging apparatus 204 may expose the second imaging sensors of the second imaging apparatus 204 during the second predetermined period to capture image data corresponding to the target object.

In some embodiments, the first imaging apparatus 202 and/or the second imaging apparatus 204 may generate and transmit a signal to the illumination source 206 to cause the source 206 to emit illumination pulses in synchronization with an exposure period of the first imaging apparatus 202 and/or the second imaging apparatus 204. For example, the second imaging apparatus 204 may generate and transmit a signal to the illumination source 206 indicating that the apparatus 204 has an exposure period that is longer than the exposure period of the first imaging apparatus 202. As a result, the illumination source 206 may adjust the emission time of the illumination pulse to ensure that the exposure period of the second imaging apparatus 204 falls entirely within the predefined period defined by the illumination pulse. Additionally, or alternatively, the signal transmitted to the illumination source 206 may indicate that the first imaging apparatus 202 and/or the second imaging apparatus 204 is configured to capture image data (e.g., expose) during a start time and an end time, during which, the illumination source 206 is not configured to emit an illumination pulse. Responsive to receiving the signal, the illumination source 206 may emit an illumination pulse at the start time of the exposure period for the respective imaging apparatus 202, 204 to ensure that the respective imaging apparatus 202, 204 has adequate illumination while capturing image data. This may be of particular use, for example, when the first imaging apparatus 202, the second imaging apparatus 204, and/or any other imaging apparatus is an external imaging apparatus that is not included within a housing of the example imaging system 200.

Moreover, in certain embodiments, the illumination source 206 may trigger the exposure of the first imaging apparatus 202 and/or the second imaging apparatus 204. For example, the illumination source 206 may emit an illumination pulse, and simultaneously send an activation signal to the first imaging apparatus 202 and/or the second imaging apparatus 204 in order to cause either or both apparatuses to capture image data during the predetermined period. The illumination source 206 may cause both imaging apparatuses 202, 204 to expose simultaneously, and/or the source 206 may send two signals during the image capture duration to stagger the exposure of the apparatuses 202, 204 during the image capture duration. For example, the illumination source 206 may transmit a first activation signal to the first imaging apparatus 202 simultaneously with the emission of the illumination pulse, and the source 206 may transmit a second activation signal to the second imaging apparatus 204 sometime after the first activation signal but still within the predetermined period defined by the illumination pulse.

Additionally, or alternatively, in certain embodiments, the exposure periods for one or both of the imaging apparatuses 202, 204 may exceed the predetermined period. The predetermined period may not provide one or both of the imaging apparatuses 202, 204 adequate time to capture the image data, and as a result, one or both of the imaging apparatuses 202, 204 may need to expose for a duration that extends beyond/before the predetermined period to ensure the imaging sensors are adequately exposed to the external environment. For example, the second imaging apparatus 204 may begin exposure after the first imaging apparatus 202, and may require a longer exposure period than the first imaging apparatus 202. The second imaging apparatus 204 may continue exposing the imaging sensors after the illumination from the illumination pulse has ceased, and the imaging sensors of the second imaging apparatus 204 may rely on ambient illumination to provide further illumination during the remaining exposure. As another example, the first imaging apparatus 202 may begin exposure to the external environment before the illumination source 206 emits an illumination pulse. Thus, the first imaging apparatus 202 may also rely, in part, on ambient light to provide illumination during an exposure period of the imaging sensors of the first imaging apparatus 202.

In some embodiments, the illumination source 206 may include multiple LEDs and multiple lenses in order to provide optimal illumination for the first imaging apparatus 202 and the second imaging apparatus 204. Some of the multiple lenses and/or the multiple LEDs may be optimally configured to provide illumination for the first imaging apparatus 202, such that some/all of the first FOV 202a is illuminated with light that optimally illuminates, for example, an indicia associated with a target object for indicia payload decoding. Similarly, some of the multiple lenses and/or the multiple LEDs may be optimally configured to provide illumination for the second imaging apparatus 204, such that some/all of the second FOV 204a is illuminated with light that optimally illuminates, for example, a target object for various visual analysis tasks. For example, when emitting an illumination pulse, during which, the first imaging apparatus 202 is exposed to capture image data, the illumination source 206 may utilize a first LED and a first lens to illuminate the first FOV 202a. When emitting an illumination pulse, during which, the second imaging apparatus 204 is exposed to capture image data, the illumination source 206 may utilize the first LED, a second LED, a third LED, and a second lens to illuminate the second FOV 204a.

FIG. 2B is a block diagram representative of an example logic circuit capable of implementing, for example, one or more components of the example imaging system 200 of FIG. 2A. The example logic circuit of FIG. 2B is a processing platform 210 capable of executing instructions to, for example, implement operations of the example methods described herein, as may be represented by the flowcharts of the 5 drawings that accompany this description. Other example logic circuits capable of, for example, implementing operations of the example methods described herein include field programmable gate arrays (FPGAs) and application specific integrated circuits (ASICs).

The example processing platform 210 of FIG. 2B includes a processor 212 such as, for example, one or more microprocessors, controllers, and/or any suitable type of processor. The example processing platform 210 of FIG. 2B includes memory (e.g., volatile memory, non-volatile memory) 214 accessible by the processor 212 (e.g., via a memory controller). The example processor 212 interacts with the memory 214 to obtain, for example, machine-readable instructions stored in the memory 214 corresponding to, for example, the operations represented by the flowcharts of this disclosure. The example processor 212 may also interact with the memory 214 to obtain, or store, instructions related to the first imaging apparatus 202, the second imaging apparatus 204, and/or the illumination source 206. Additionally, or alternatively, machine-readable instructions corresponding to the example operations described herein may be stored on one or more removable media (e.g., a compact disc, a digital versatile disc, removable flash memory, etc.) that may be coupled to the processing platform 210 to provide access to the machine-readable instructions stored thereon.

As illustrated in FIG. 2B, the first imaging apparatus 202 includes a first imaging sensor(s) 202b, and the second imaging apparatus 204 includes a second imaging sensor(s) 204b. As previously mentioned, each of the first imaging apparatus 202 and the second imaging apparatus 204 may also include shutters (not shown) that may electronically (or mechanically) expose the first imaging sensor(s) 202b and/or the second imaging sensor(s) 204b to an external environment for image data capture. Moreover, each of the first imaging sensor(s) 202b and/or the second imaging sensor(s) 204b may include one or more sensors configured to capture image data corresponding to a target object, an indicia associated with the target object, and/or any other suitable image data.

The example processing platform 210 of FIG. 2B also includes a network interface 216 to enable communication with other machines via, for example, one or more networks. The example network interface 216 includes any suitable type of communication interface(s) (e.g., wired and/or wireless interfaces) configured to operate in accordance with any suitable protocol(s). For example, in some embodiments, networking interface 216 may transmit data or information (e.g., imaging data, illumination pulse emission signals, etc., described herein) between remote processor(s) 222 and/or remote server 220, and processing platform 210.

The example, processing platform 210 of FIG. 2B also includes input/output (I/O) interfaces 218 to enable receipt of user input and communication of output data to the user.

FIG. 3A is a graph 300 illustrating a prior art activation sequence of multiple image sensors in a prior art barcode reader. As illustrated in FIG. 3A, the graph 300 includes a first line 302 representing an exposure sequence corresponding to a first imaging sensor operating as a global shutter imaging sensor, a second line 304 representing an exposure sequence corresponding to a second imaging sensor operating as a global shutter imaging sensor, and a third line 306 representing an illumination level provided by an illumination source. Generally speaking, the prior art activation sequence includes two periods 301a, 301b, during which, the imaging sensors capture image data. Namely, the first exposure period 302a for the first imaging sensor is during the first period 301a, the second exposure period 304a for the second imaging sensor is during the second period 301b, and both imaging sensors capture multiple image frames 302a1, 302a2, 304a1, 304a2 during the respective exposure periods 302a, 304a operating as global shutter imaging sensors.

At the beginning of the first period 301a, the illumination source may emit illumination, as represented by the increased level of illumination at point 306a on the third line 306. In the prior art activation sequence, the first imaging apparatus may trigger the first exposure period 302a of the first imaging sensor based on this initial illumination emission by the illumination source. Accordingly, the exposure of the first imaging sensor increases simultaneously with the increased level of illumination at point 306a, and the first imaging sensor captures a set of image frames 302a1, 302a2 simultaneously during the first exposure period 302a. The first imaging apparatus may then perform a sensor readout of the first imaging sensor after the first exposure period 302a ends and before a subsequent exposure of the first imaging sensor begins (e.g., during the second period 301b).

However, the exposure of the second imaging sensor elevates during the second period 301b after the first imaging sensor, but while the illumination emitted from the illumination source is still present. The second imaging sensor then captures a set of image frames 304a1, 304a2 simultaneously during the second exposure period 304a. The second imaging apparatus may then then perform a sensor readout of the second imaging sensor after the second exposure period 304a ends and before a subsequent exposure of the second imaging sensor begins (e.g., during and/or after the second period 301b).

As previously mentioned, this prior art activation sequence suffers from a number of drawbacks. For example, global shutter imaging sensors require dedicated image signal processors (ISPs), which increases the complexity and cost of conventional devices while minimizing the space available for additional features and increasing the overall device size. Rolling shutter imaging sensors typically include dedicated ISPs, which alleviates these issues completely. Moreover, such rolling shutter imaging sensors capture images with sufficient resolution for visual imaging applications (e.g., scan avoidance detection). Thus, the multiple global shutter imaging sensor configuration represented in the prior art activation sequence (and utilized in conventional devices) introduces unnecessary complexity, cost, and device size requirements in order to accomplish both indicia scanning/decoding and visual imaging applications.

Figure 3B:
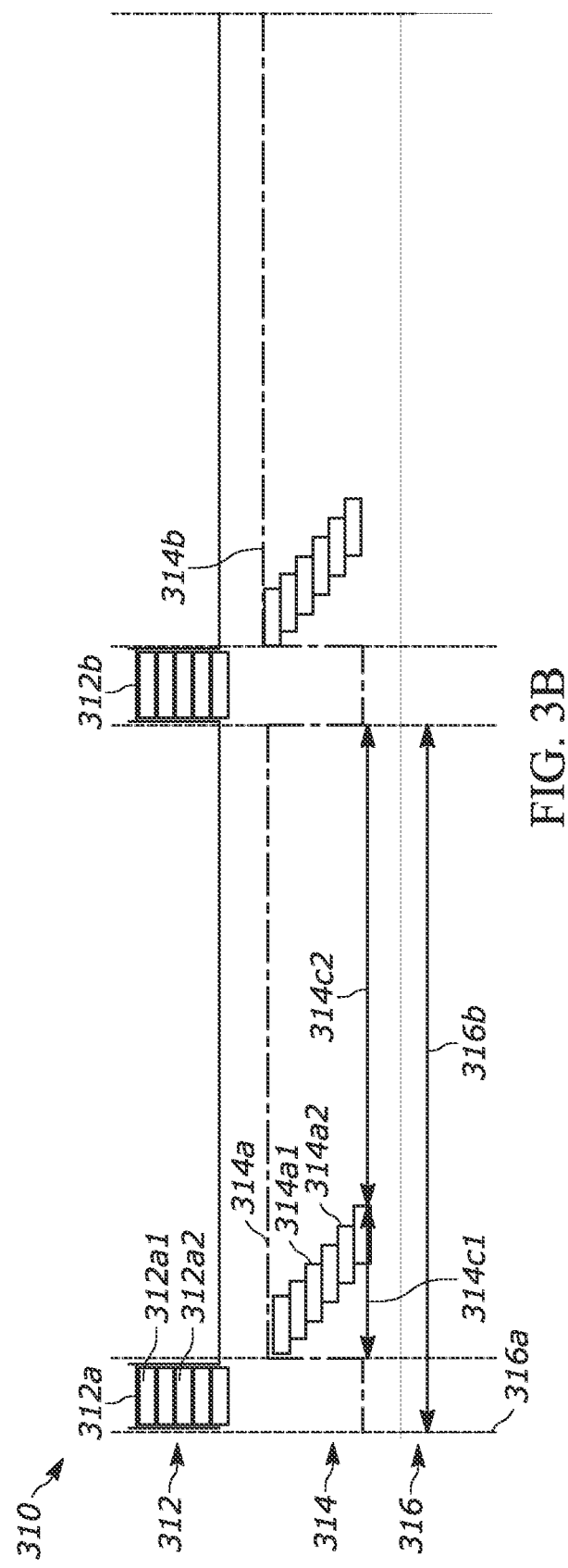
FIG. 3B is a graph illustrating a first exemplary activation sequence of the illumination source, a first imaging sensor, and a second imaging sensor, in accordance with embodiments disclosed herein.

However, as illustrated in FIGS. 3B-3F, the techniques of the present disclosure alleviate these issues associated with conventional systems and activation sequences. For example, FIG. 3B is a graph 310 illustrating a first exemplary activation sequence of the illumination source (e.g., illumination source 206), a first imaging sensor (e.g., first imaging sensor 202), and a second imaging sensor (e.g., second imaging sensor 204), in accordance with embodiments disclosed herein. As illustrated in FIG. 3B, the graph 310 includes a first line 312 representing the exposure of a first imaging sensor (e.g., first imaging sensor 202b), a second line 314 representing the exposure of a second imaging sensor (e.g., second imaging sensor 204b), and a third line 316 representing an illumination level provided by the illumination source 206. As previously described, the illumination pulses emitted by the illumination source 206 may define a predetermined period, during which, the imaging apparatuses may expose and capture image data. One such predetermined period 316b is illustrated in FIG. 3B by the period delineated by a beginning of a first exposure period 312a of the first imaging sensor and a beginning of a subsequent exposure period 312b of the first imaging sensor. It should be understood that an "predetermined period," as described herein, may be any period of time during which illumination from illumination pulses emitted by the illumination source 206 is present. Moreover, an "exposure period," as described herein, may include image capture and image data readout as all/some of the corresponding exposure period.

Generally speaking, the graph 310 representing the first exemplary activation sequence may indicate an interleaving of global shutter imaging sensor (e.g., the first imaging sensor represented on the first line 312) exposure periods 312a, 312b and rolling shutter imaging sensor (e.g., the second imaging sensor represented on the second line 314) exposure periods 314a, 314b. In particular, the graph 310 representing the first exemplary activation sequence indicates that the exposure periods 314a, 314b of the rolling shutter imaging sensor begin/end simultaneously and/or nearly simultaneously with adjacent exposure periods (e.g., a first exposure period 312a and subsequent exposure period 312b) corresponding to the global shutter imaging sensor. In this manner, the rolling imaging shutter may maximize the time between adjacent global shutter imaging sensor exposure periods in order to utilize the illumination emitted by the illumination source during each exposure period (e.g., 314a, 314b) for image capture and/or data readout.

At the beginning of the predetermined period 316b, the illumination source 206 may emit an illumination pulse, as represented by the increased level of illumination at point 316a on the first line 316. In the first exemplary activation sequence, the first imaging apparatus may trigger the first exposure period 312a based on this initial illumination pulse emission by the illumination source 206. Accordingly, the exposure of the first imaging apparatus 202 begins simultaneously with the increased level of illumination, such that the first imaging sensor captures multiple image frames 312a1, 312a2 simultaneously during the first exposure period 312a. When the first exposure period 312a ends, the second imaging apparatus may begin the second exposure period 314a in order for the second imaging sensor to capture multiple image frames 314a1, 314a2 sequentially during the second exposure period 314a. Thus, as illustrated in FIG. 3B, the image data capture performed by the first and second imaging sensors, is performed in accordance with operation as a global shutter imaging sensor and a rolling shutter imaging sensor, respectively.

In particular, as illustrated in FIG. 3B, the exposure periods 312a, 314a of the respective imaging apparatuses are different from one another as well as the predetermined period 316b, and the frame capture sequences of the two imaging sensors are also different. The first exposure period 312a for the first imaging sensor ends just before and/or nearly simultaneously with the beginning of the second exposure period 314a, such that the imaging shutter of the first imaging sensor stops exposure of the first imaging sensor just before and/or nearly simultaneously with the imaging shutter of the second imaging sensor beginning exposure of the second imaging sensor. The first imaging apparatus may then begin an image readout for the first imaging sensor, which may extend from the end of the first exposure period 312a to the beginning of the subsequent exposure period 312b and/or any suitable period there between. The image readout of the first imaging sensor (and/or the second imaging sensor) may include emptying the photosites of the first imaging sensor in order to begin analyzing the image data represented by the electrons stored in the respective photosites. The image readout for the first imaging sensor may occur for all image frames 312a1, 312a2 simultaneously, as each image frame 312a1, 312a2 is captured simultaneously. However, in certain aspects, the image readout for the first imaging sensor may occur in a sequential manner, such that the image frame 312a1 may be read from the corresponding photosites of the first imaging sensor before the image frame 312a2 is read from the corresponding photosites of the first imaging sensor.

Further, as illustrated in FIG. 3B, the second imaging sensor may capture image frames 314a1, 314a2 during a first subset 314c1 of the second exposure period 314a. During a second subset 314c2 of the second exposure period 314a (e.g., without image frame 314a1, 314a2 captures), the second imaging apparatus may perform an image readout of the second imaging sensor in order to begin analyzing the image data captured by the second imaging sensor during the first subset 314c1 of the second exposure period 314a. This second subset 314c2 of the second exposure period 314a including the image readout of the second imaging sensor may begin immediately following the capture of the last image frame (e.g., frames 314a1, 314a2) and may extend until the end of the second exposure period 314a and/or any suitable period there between. Additionally, or alternatively, the image readout of the second imaging sensor may begin for each image frame 314a1, 314a2 after the individual image frame 314a1, 314a2 is captured. For example, the second imaging apparatus may begin an image readout of the image frame 314a1 immediately following the capture of the image frame 314a1, such that the image frame 314a1 is being read from the corresponding photosites of the second imaging sensor while the image frame 314a2 is being captured. In this manner, the image readout for the second imaging sensor may be performed sequentially, similar to the sequential capture of the image frames 314a1, 314a2.

In any event, the illumination level beginning at point 316a that is provided by the illumination pulse may last through the predetermined period 316b, such that subsequent exposure periods 312b, 314b for both imaging sensors may be illuminated. The illumination pulse emitted by the illumination source may last any suitable duration (e.g., 5 milliseconds (ms), 16 ms, 50 ms) in order to provide adequate illumination during both exposure periods 312a, 314a and any suitable number of subsequent exposure periods 312b, 314b in order to capture image data sufficient to perform the image analysis techniques mentioned herein (e.g., barcode scanning/decoding, image recognition, etc.). For example, the illumination pulse emitted by the illumination source may last over 32 ms in order to provide illumination for at least two exposure periods for both imaging sensors. This first exemplary activation sequence illustrated by the graph 310 may repeat iteratively any suitable number of times in order to capture any sufficient number of images (e.g., frames 312a1, 312a2, 314a1, 314a2) for any suitable image analysis purposes (e.g., indicia payload decoding, facial recognition, scan avoidance detection, etc.).

FIG. 3C is a graph 320 illustrating a second exemplary activation sequence of the illumination source (e.g., illumination source 206), a first imaging sensor (e.g., first imaging sensor 202), and a second imaging sensor (e.g., second imaging sensor 204), in accordance with embodiments disclosed herein. As illustrated in FIG. 3C, the graph 320 includes a first line 322 representing the exposure of a first imaging sensor (e.g., first imaging sensor 202b), a second line 324 representing the exposure of a second imaging sensor (e.g., second imaging sensor 204b), and a third line 326 representing an illumination level provided by the illumination source 206. As previously described, the illumination pulses emitted by the illumination source 206 may define a predetermined period, during which, the imaging apparatuses may expose and capture image data. Several predetermined periods 326a, 326b, 326c, 326d are illustrated in FIG. 3C and may correspond to several exposure periods 322a, 322b, 324a, 324b of the first imaging sensor and the second imaging sensor.

Generally speaking, the graph 320 representing the second exemplary activation sequence may indicate an interleaving of global shutter imaging sensor (e.g., the first imaging sensor represented on the first line 322) exposure periods 322a, 322b and rolling shutter imaging sensor (e.g., the second imaging sensor represented on the second line 324) exposure periods 324a, 324b. In particular, the graph 320 representing the second exemplary activation sequence indicates that the exposure periods 324a, 324b of the rolling shutter imaging sensor are centered between adjacent exposure periods (e.g., a first exposure period 322a and a third exposure period 322b) corresponding to the global shutter imaging sensor. In this manner, the second imaging sensor may maximize the time between adjacent global shutter imaging sensor exposure periods while simultaneously minimizing the impact of the illumination emitted by the illumination source during those global shutter imaging sensor exposure periods.

At the beginning of the first predetermined period 326a, the illumination source 206 may emit an illumination pulse, as represented by the increased level of illumination on the third line 326. In the second exemplary activation sequence, the first imaging apparatus may trigger the first exposure period 322a based on this initial illumination pulse emission by the illumination source 206. Accordingly, the exposure of the first imaging apparatus may begin simultaneously and/or nearly simultaneously with the increased level of illumination, such that the first imaging sensor captures multiple image frames 322a1, 322a2 simultaneously during the first exposure period 322a. When the first exposure period 322a ends, the first predetermined period 326a may end shortly afterwards, such that the illumination emitted by the illumination source 206 also ends.

Subsequently, at the beginning of the second predetermined period 326b, the illumination source 206 may emit another illumination pulse, as represented by the increased level of illumination on the third line 326. In the second exemplary activation sequence, the second imaging apparatus may trigger the second exposure period 324a based on this illumination pulse emission by the illumination source 206. Accordingly, the exposure of the second imaging apparatus may begin simultaneously and/or nearly simultaneously with the increased level of illumination, such that the second imaging sensor captures multiple image frames 324a1, 324a2 sequentially during the second exposure period 324a. When the second exposure period 324a ends, the second predetermined period 326b may end shortly afterwards, such that the illumination emitted by the illumination source 206 also ends.

At the beginning of the third predetermined period 326c, the illumination source 206 may emit another illumination pulse, as represented by the increased level of illumination on the third line 326. In the second exemplary activation sequence, the first imaging apparatus may trigger the third exposure period 322b based on this illumination pulse emission by the illumination source 206. Accordingly, the exposure of the first imaging apparatus may begin shortly after the increased level of illumination, such that the first imaging sensor captures multiple image frames 322b1, 322b2 simultaneously during the third exposure period 322b. When the third exposure period 322b ends, the third predetermined period 326c may end shortly afterwards, such that the illumination emitted by the illumination source 206 also ends.

Thereafter, at the beginning of the fourth predetermined period 326d, the illumination source 206 may emit another illumination pulse, as represented by the increased level of illumination on the third line 326. In the second exemplary activation sequence, the second imaging apparatus may trigger the fourth exposure period 324b based on this illumination pulse emission by the illumination source 206. Accordingly, the exposure of the second imaging apparatus may begin simultaneously and/or nearly simultaneously after the increased level of illumination, such that the second imaging sensor captures multiple image frames 324b1, 324b2 sequentially during the fourth exposure period 324b. When the fourth exposure period 324b ends, the fourth predetermined period 326d may end simultaneously and/or shortly afterwards, such that the illumination emitted by the illumination source 206 also ends.

As illustrated in FIG. 3C, the exposure periods 322a-b, 324a-b of the respective imaging apparatuses are different from one another as well as the predetermined periods 326a, c, and the frame capture sequences of the two imaging sensors are also different. The first exposure period 322a for the first imaging sensor ends just before and/or nearly simultaneously with the end of the first predetermined period 326a. The first imaging apparatus may then begin an image readout for the first imaging sensor, which may extend from the end of the first exposure period 322a to the beginning of the third exposure period 322b and/or any suitable period there between. The image readout for the first imaging sensor may occur for all image frames 322a1, 322a2 simultaneously, as each image frame 322a1, 322a2 is captured simultaneously. However, in certain aspects, the image readout for the first imaging sensor may occur in a sequential manner, such that the image frame 322a1 may be read from the corresponding photosites of the first imaging sensor before the image frame 322a2 is read from the corresponding photosites of the first imaging sensor.

Further, as illustrated in FIG. 3C, the second imaging sensor may capture image frames 324a1, 324a2 for a first subset 324c1 of the second exposure period 324a. During a second subset 324c2 of the second exposure period 324a (e.g., without image frame 324a1, 324a2 captures), the second imaging apparatus may perform an image readout of the second imaging sensor in order to begin analyzing the image data captured by the second imaging sensor during the first subset 324c1 of the second exposure period 324a. This second subset 324c2 of the second exposure period 324a including the image readout of the second imaging sensor may begin immediately following the capture of the last image frame (e.g., frames 324a1, 324a2) and may extend until the end of the second exposure period 324a and/or any suitable period there between. Additionally, or alternatively, the image readout of the second imaging sensor may begin for each image frame 324a1, 324a2 after the individual image frame 324a1, 324a2 is captured. For example, the second imaging apparatus may begin an image readout of the image frame 324a1 immediately following the capture of the image frame 324a1, such that the image frame 324a1 is being read from the corresponding photosites of the second imaging sensor while the image frame 324a2 is being captured. In this manner, the image readout for the second imaging sensor may be performed sequentially, similar to the sequential capture of the image frames 324a1, 324a2.

Moreover, as illustrated in FIG. 3C, the illumination emitted by the illumination source 206 may overlap and/or slightly exceed the boundaries of any particular exposure period. For example, the illumination emitted by the illumination source defining the third predetermined period 326c may last longer than the corresponding third exposure period 322b of the first imaging sensor. In this manner, the first imaging sensor may receive maximum illumination during the capture of each image frame 322b1, 322b2, and the illumination may end prior to the beginning of, and thereby not interfere with, the fourth exposure period 324b of the second imaging sensor. Regardless, this second exemplary activation sequence illustrated by the graph 320 may repeat iteratively any suitable number of times in order to capture any sufficient number of images (e.g., frames 322a1, 322a2, 322b1, 322b2, 324a1, 324a2, 324b1, 324b2) for any suitable image analysis purposes (e.g., indicia payload decoding, facial recognition, scan avoidance detection, etc.).

Figure 3D:
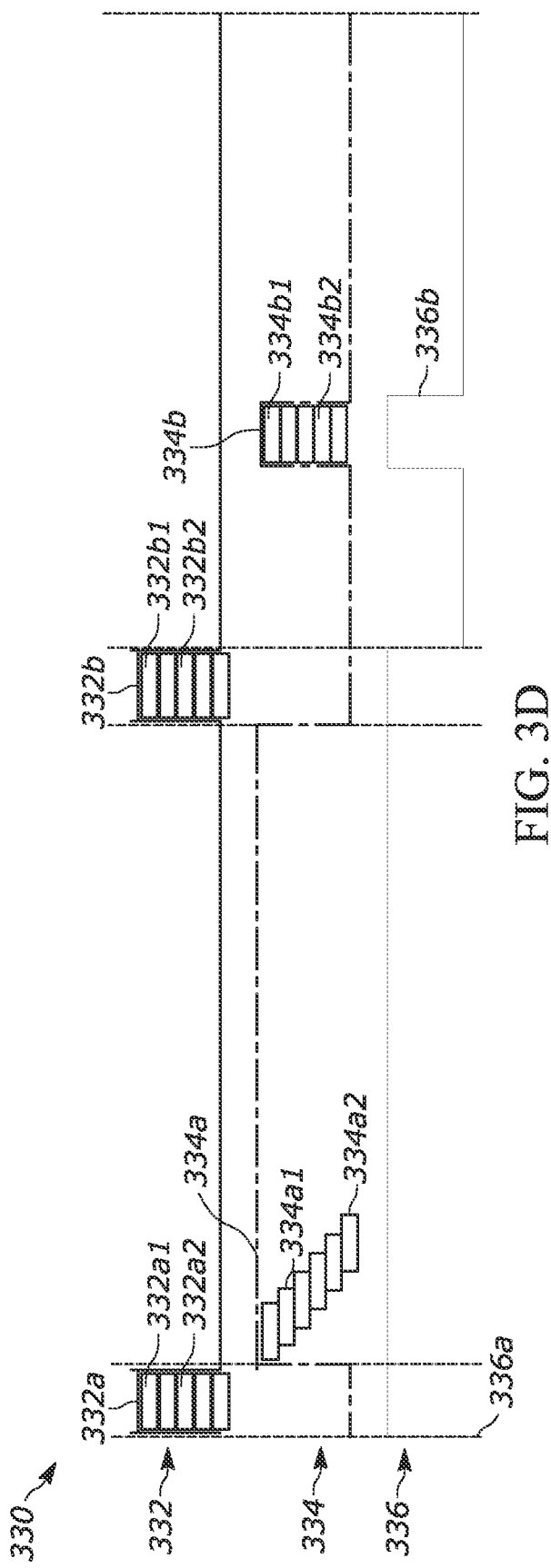
FIG. 3D is a graph illustrating a third exemplary activation sequence of the illumination source, the first imaging sensor, and the second imaging sensor, in accordance with embodiments disclosed herein.

FIG. 3D is a graph 330 illustrating a third exemplary activation sequence of the illumination source (e.g., illumination source 206), a first imaging sensor (e.g., first imaging sensor 202), and a second imaging sensor (e.g., second imaging sensor 204), in accordance with embodiments disclosed herein. As illustrated in FIG. 3D, the graph 330 includes a first line 332 representing the exposure of a first imaging sensor (e.g., first imaging sensor 202b), a second line 334 representing the exposure of a second imaging sensor (e.g., second imaging sensor 204b), and a third line 336 representing an illumination level provided by the illumination source 206. As previously described, the illumination pulses emitted by the illumination source 206 may define a predetermined period, during which, the imaging apparatuses may expose and capture image data. Two predetermined periods 336a, 336b are illustrated in FIG. 3D and may correspond to several exposure periods 332a, 332b, 334a, 334b of the first imaging sensor and the second imaging sensor.

Generally speaking, the graph 330 representing the third exemplary activation sequence may indicate an interleaving of global shutter imaging sensor (e.g., the first imaging sensor represented on the first line 332) exposure periods 332a, 332b, rolling shutter imaging sensor (e.g., the second imaging sensor represented on the second line 334) exposure period 334a, and a subsequent global shutter imaging sensor (e.g., the second imaging sensor operating as a global shutter imaging sensor) exposure period 334b. In particular, the graph 330 representing the third exemplary activation sequence indicates that the second imaging sensor is operating as a rolling shutter imaging sensor during the second exposure period 334a and the second imaging sensor is operating as a global shutter imaging sensor during the fourth exposure period 334b. In this manner, the second imaging sensor may selectively change how image frame captures are performed during subsequent exposure periods (e.g., exposure periods 334a, 334b) in order to optimize the image frame captures for particular image analysis purposes. For example, capturing image frames while operating as a rolling shutter imaging sensor (e.g., during second exposure period 334a) may be optimal for image analysis techniques that are not very motion sensitive, and capturing image frames while operating as a global shutter imaging sensor (e.g., during fourth exposure period 334a) may be optimal for image analysis techniques that are motion sensitive.

At the beginning of the first predetermined period 336a, the illumination source 206 may emit an illumination pulse, as represented by the increased level of illumination on the third line 336. In the third exemplary activation sequence, the first imaging apparatus may trigger the first exposure period 332a based on this initial illumination pulse emission by the illumination source 206. Accordingly, the exposure of the first imaging apparatus may begin simultaneously and/or nearly simultaneously with the increased level of illumination, such that the first imaging sensor captures multiple image frames 332a1, 332a2 simultaneously during the first exposure period 332a. When the first exposure period 332a ends, the first predetermined period 336a may continue, such that the illumination emitted by the illumination source 206 also continues into the second exposure period 334a of the second imaging sensor.

Subsequently, the second imaging apparatus may trigger the second exposure period 334a still utilizing the illumination provided as part of the first predetermined period 336a. Accordingly, the exposure of the second imaging apparatus may begin simultaneously and/or nearly simultaneously with the end of the first exposure period 332a, such that the second imaging sensor captures multiple image frames 334a1, 334a2 sequentially during the second exposure period 334a. When the second exposure period 334a ends, the first predetermined period 336a may continue, such that the illumination emitted by the illumination source 206 also continues into the third exposure period 332b of the first imaging sensor.

Thereafter, the first imaging apparatus may trigger the third exposure period 332b still utilizing the illumination provided as part of the first predetermined period 336a. Accordingly, the exposure of the first imaging apparatus may simultaneously and/or nearly simultaneously with the end of the second exposure period 334a, such that the first imaging sensor captures multiple image frames 332b1, 332b2 simultaneously during the third exposure period 332b. When the third exposure period 332b ends, the first predetermined period 336a may end shortly afterwards, such that the illumination emitted by the illumination source 206 also ends.

At the beginning of the second predetermined period 336b, the illumination source 206 may emit another illumination pulse, as represented by the increased level of illumination on the third line 336. In the third exemplary activation sequence, the second imaging apparatus may trigger the fourth exposure period 334b based on this illumination pulse emission by the illumination source 206. Accordingly, the exposure of the second imaging apparatus may begin simultaneously and/or nearly simultaneously after the increased level of illumination, such that the second imaging sensor captures multiple image frames 334b1, 334b2 simultaneously during the fourth exposure period 334b. When the fourth exposure period 334b ends, the second predetermined period 336b may end simultaneously and/or shortly afterwards, such that the illumination emitted by the illumination source 206 also ends.

As illustrated in FIG. 3D, the exposure periods 334a, 334b of the second imaging sensor are different from one another. Namely, the second exposure period 334a represents the second imaging sensor operating as a rolling shutter imaging sensor, and the fourth exposure period 334b represents the second imaging sensor operating as a global shutter imaging sensor. As previously mentioned, selectively operating the second imaging sensor as a rolling/global shutter imaging sensor enables the second imaging sensor to capture image data in accordance with the particular imaging requirements of the image analysis intended to be performed on the captured image frames 334a1, 334a2, 334b1, 334b2. Moreover, as illustrated in FIG. 3D, the illumination source 206 may be configured to emit illumination suitable for such a change in the operation of the second imaging sensor. The first predetermined period 336a represents illumination lasting through each of the first exposure period 332a, the second exposure period 334a, and the third exposure period 332b. When the second imaging sensor begins operating as a global shutter imaging sensor, the illumination source 206 emits illumination lasting the fourth exposure period 334b, as illustrated by the second predetermined period 336.

Of course, this third exemplary activation sequence illustrated by the graph 330 may repeat iteratively any suitable number of times in order to capture any sufficient number of images (e.g., frames 332a1, 332a2, 332b1, 332b2, 334a1, 334a2, 334b1, 334b2) for any suitable image analysis purposes (e.g., indicia payload decoding, facial recognition, scan avoidance detection, etc.).

Figure 3E:
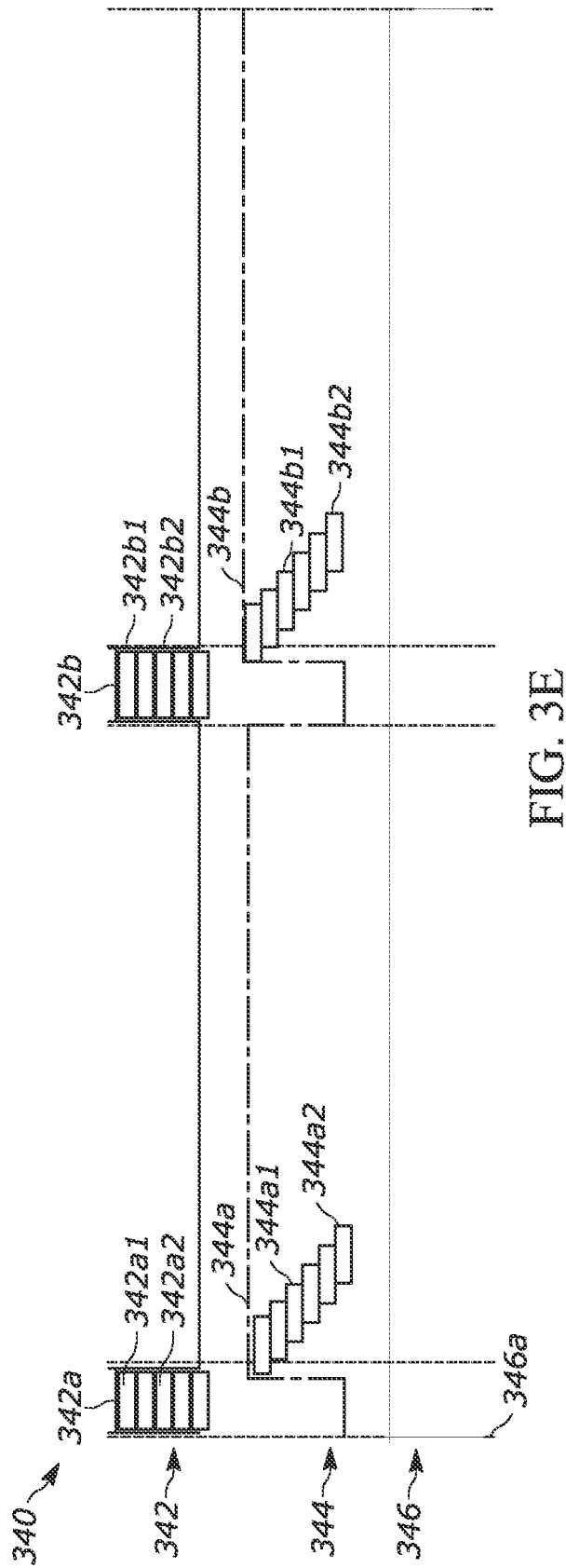
FIG. 3E is a graph illustrating a fourth exemplary activation sequence of the illumination source, the first imaging sensor, and the second imaging sensor, in accordance with embodiments disclosed herein.

FIG. 3E is a graph 340 illustrating a fourth exemplary activation sequence of the illumination source (e.g., illumination source 206), a first imaging sensor (e.g., first imaging sensor 202), and a second imaging sensor (e.g., second imaging sensor 204), in accordance with embodiments disclosed herein. As illustrated in FIG. 3E, the graph 340 includes a first line 342 representing the exposure of a first imaging sensor (e.g., first imaging sensor 202b), a second line 344 representing the exposure of a second imaging sensor (e.g., second imaging sensor 204b), and a third line 346 representing an illumination level provided by the illumination source 206. As previously described, the illumination pulses emitted by the illumination source 206 may define a predetermined period, during which, the imaging apparatuses may expose and capture image data. One such predetermined period 346a is illustrated in FIG. 3E and may correspond to several exposure periods 342a, 342b, 344a, 344b of the first imaging sensor and the second imaging sensor.

Generally speaking, the graph 340 representing the fourth exemplary activation sequence may indicate an interleaving of global shutter imaging sensor (e.g., the first imaging sensor represented on the first line 342) exposure periods 342a, 342b and rolling shutter imaging sensor (e.g., the second imaging sensor represented on the second line 334) exposure periods 344a, 344b. In particular, the graph 340 representing the fourth exemplary activation sequence indicates that the second exposure period 344a and the fourth exposure period 344b begin within the first exposure period 342a and the third exposure period 342b, respectively. In this manner, the second imaging sensor may begin capturing image data at least partially while the first imaging sensor is also capturing image data.

At the beginning of the first predetermined period 346a, the illumination source 206 may emit an illumination pulse, as represented by the increased level of illumination on the third line 346. In the fourth exemplary activation sequence, the first imaging apparatus may trigger the first exposure period 342a based on this initial illumination pulse emission by the illumination source 206. Accordingly, the exposure of the first imaging apparatus may begin simultaneously and/or nearly simultaneously with the increased level of illumination, such that the first imaging sensor captures multiple image frames 342a1, 342a2 simultaneously during the first exposure period 342a. When the first exposure period 342a ends, the first predetermined period 346a may continue, such that the illumination emitted by the illumination source 206 also continues into the second exposure period 344a of the second imaging sensor.

Subsequently, the second imaging apparatus may trigger the second exposure period 344a still utilizing the illumination provided as part of the first predetermined period 346a, and at least partially during the first exposure period 342a. Accordingly, the exposure of the second imaging apparatus may begin prior to the end of the first exposure period 342a, and the second imaging sensor may capture multiple image frames 344a1, 344a2 sequentially during the second exposure period 344a. When the second exposure period 344a ends, the first predetermined period 346a may continue, such that the illumination emitted by the illumination source 206 also continues into the third exposure period 342b of the first imaging sensor.

Thereafter, the first imaging apparatus may trigger the third exposure period 342b still utilizing the illumination provided as part of the first predetermined period 346a. Accordingly, the exposure of the first imaging apparatus may simultaneously and/or nearly simultaneously with the end of the second exposure period 344a, and the first imaging sensor may capture multiple image frames 342b1, 342b2 simultaneously during the third exposure period 342b. When the third exposure period 342b ends, the first predetermined period 346a may still continue, such that the illumination emitted by the illumination source 206 also continues into the fourth exposure period 344b of the second imaging sensor.

Further, in the fourth exemplary activation sequence, the second imaging apparatus may trigger the fourth exposure period 344b still utilizing the illumination provided as part of the first predetermined period 346a, and at least partially during the third exposure period 342b. Accordingly, the exposure of the second imaging apparatus may begin prior to the end of the third exposure period 342b, and the second imaging sensor may capture multiple image frames 344b1, 344b2 sequentially during the fourth exposure period 344b. When the fourth exposure period 344b ends, the first predetermined period 346a may end simultaneously and/or shortly afterwards, such that the illumination emitted by the illumination source 206 also ends.

As illustrated in FIG. 3E, the illumination source 206 may be configured to emit illumination to provide illumination for each of the first exposure period 342a, the second exposure period 344a, the third exposure period 342b, and the fourth exposure period 344b proceeding in sequence. Moreover, this fourth exemplary activation sequence illustrated by the graph 340 may repeat iteratively any suitable number of times in order to capture any sufficient number of images (e.g., frames 342a1, 342a2, 342b1, 342b2, 344a1, 344a2, 344b1, 344b2) for any suitable image analysis purposes (e.g., indicia payload decoding, facial recognition, scan avoidance detection, etc.).

Figure 3F:
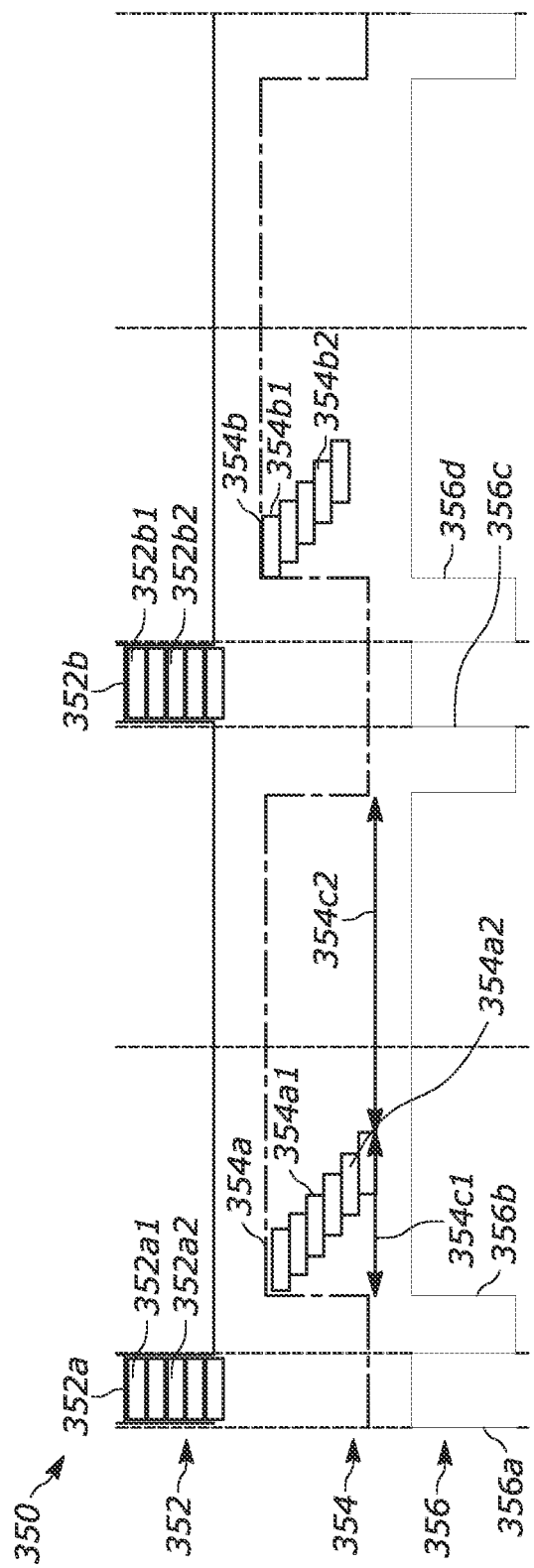
FIG. 3F is a graph illustrating a fifth exemplary activation sequence of the illumination source, the first imaging sensor, and the second imaging sensor, in accordance with embodiments disclosed herein.

FIG. 3F is a graph 350 illustrating a fifth exemplary activation sequence of the illumination source (e.g., illumination source 206), a first imaging sensor (e.g., first imaging sensor 202), and a second imaging sensor (e.g., second imaging sensor 204), in accordance with embodiments disclosed herein. As illustrated in FIG. 3C, the graph 350 includes a first line 352 representing the exposure of a first imaging sensor (e.g., first imaging sensor 202b), a second line 354 representing the exposure of a second imaging sensor (e.g., second imaging sensor 204b), and a third line 356 representing an illumination level provided by the illumination source 206. As previously described, the illumination pulses emitted by the illumination source 206 may define a predetermined period, during which, the imaging apparatuses may expose and capture image data. Several predetermined periods 356a, 356b, 356c, 356d are illustrated in FIG. 3F and may correspond to several exposure periods 352a, 352b, 354a, 354b of the first imaging sensor and the second imaging sensor.

Generally speaking, the graph 350 representing the fifth exemplary activation sequence may indicate an interleaving of global shutter imaging sensor (e.g., the first imaging sensor represented on the first line 352) exposure periods 352a, 352b and rolling shutter imaging sensor (e.g., the second imaging sensor represented on the second line 354) exposure periods 354a, 354b. In particular, the graph 350 representing the fifth exemplary activation sequence indicates that the exposure periods 354a, 354b of the rolling shutter imaging sensor are centered between adjacent exposure periods (e.g., a first exposure period 352a and a third exposure period 352b) corresponding to the global shutter imaging sensor. In this manner, the second imaging sensor may maximize the time between adjacent global shutter imaging sensor exposure periods while simultaneously minimizing the impact of the illumination emitted by the illumination source during those global shutter imaging sensor exposure periods. Further, the illumination emitted by the illumination source 206 (e.g., predetermined periods 356a-d) may synchronize exactly with each of the exposure periods (e.g., 352a, 352b, 354a, 354b).

At the beginning of the first predetermined period 356a, the illumination source 206 may emit an illumination pulse, as represented by the increased level of illumination on the third line 356. In the fifth exemplary activation sequence, the first imaging apparatus may trigger the first exposure period 352a based on this initial illumination pulse emission by the illumination source 206. Accordingly, the exposure of the first imaging apparatus may begin simultaneously and/or nearly simultaneously with the increased level of illumination, such that the first imaging sensor captures multiple image frames 352a1, 352a2 simultaneously during the first exposure period 352a. When the first exposure period 352a ends, the first predetermined period 356a may end simultaneously, such that the illumination emitted by the illumination source 206 also ends.

Subsequently, at the beginning of the second predetermined period 356b, the illumination source 206 may emit another illumination pulse, as represented by the increased level of illumination on the third line 356. In the fifth exemplary activation sequence, the second imaging apparatus may trigger the second exposure period 354a based on this illumination pulse emission by the illumination source 206. Accordingly, the exposure of the second imaging apparatus may begin simultaneously and/or nearly simultaneously with the increased level of illumination, such that the second imaging sensor captures multiple image frames 354a1, 354a2 sequentially during the second exposure period 354a. When the second exposure period 354a ends, the second predetermined period 356b may end simultaneously, such that the illumination emitted by the illumination source 206 also ends.

At the beginning of the third predetermined period 356c, the illumination source 206 may emit another illumination pulse, as represented by the increased level of illumination on the third line 356. In the fifth exemplary activation sequence, the first imaging apparatus may trigger the third exposure period 352b based on this illumination pulse emission by the illumination source 206. Accordingly, the exposure of the first imaging apparatus may begin simultaneously with the increased level of illumination, such that the first imaging sensor captures multiple image frames 352b1, 352b2 simultaneously during the third exposure period 352b. When the third exposure period 352b ends, the third predetermined period 356c may end simultaneously, such that the illumination emitted by the illumination source 206 also ends.

Thereafter, at the beginning of the fourth predetermined period 356d, the illumination source 206 may emit another illumination pulse, as represented by the increased level of illumination on the third line 356. In the fifth exemplary activation sequence, the second imaging apparatus may trigger the fourth exposure period 354b based on this illumination pulse emission by the illumination source 206. Accordingly, the exposure of the second imaging apparatus may begin simultaneously and/or nearly simultaneously after the increased level of illumination, such that the second imaging sensor captures multiple image frames 354b1, 354b2 sequentially during the fourth exposure period 354b. When the fourth exposure period 354b ends, the fourth predetermined period 356d may end simultaneously, such that the illumination emitted by the illumination source 206 also ends.

As illustrated in FIG. 3F, the first exposure period 352a for the first imaging sensor ends simultaneously with the end of the first predetermined period 356a. The first imaging apparatus may then begin an image readout for the first imaging sensor, which may extend from the end of the first exposure period 352a to the beginning of the third exposure period 352b and/or any suitable period there between. The image readout for the first imaging sensor may occur for all image frames 352a1, 352a2 simultaneously, as each image frame 352a1, 352a2 is captured simultaneously. However, in certain aspects, the image readout for the first imaging sensor may occur in a sequential manner, such that the image frame 352a1 may be read from the corresponding photosites of the first imaging sensor before the image frame 352a2 is read from the corresponding photosites of the first imaging sensor.

Further, as illustrated in FIG. 3F, the second imaging sensor may capture image frames 354a1, 354a2 for a first subset 354c1 of the second exposure period 354a. During a second subset 354c2 of the second exposure period 354a (e.g., without image frame 354a1, 354a2 captures), the second imaging apparatus may perform an image readout of the second imaging sensor in order to begin analyzing the image data captured by the second imaging sensor during the first subset 354c1 of the second exposure period 354a. This second subset 354c2 of the second exposure period 354a including the image readout of the second imaging sensor may begin immediately following the capture of the last image frame (e.g., frames 354a1, 354a2) and may extend until the end of the second exposure period 354a and/or any suitable period there between. Additionally, or alternatively, the image readout of the second imaging sensor may begin for each image frame 354a1, 354a2 after the individual image frame 354a1, 354a2 is captured. For example, the second imaging apparatus may begin an image readout of the image frame 354a1 immediately following the capture of the image frame 354a1, such that the image frame 354a1 is being read from the corresponding photosites of the second imaging sensor while the image frame 354a2 is being captured. In this manner, the image readout for the second imaging sensor may be performed sequentially, similar to the sequential capture of the image frames 354a1, 354a2.

Moreover, as illustrated in FIG. 3F, the illumination emitted by the illumination source 206 may synchronize exactly and/or nearly exactly with the boundaries of any particular exposure period. For example, the illumination emitted by the illumination source defining the third predetermined period 356c may last exactly as long as the corresponding third exposure period 352b of the first imaging sensor. In this manner, the first imaging sensor may receive maximum illumination during the capture of each image frame 352b1, 352b2, and the illumination may end simultaneously with the end of the corresponding third exposure period 352b. Regardless, this fifth exemplary activation sequence illustrated by the graph 350 may repeat iteratively any suitable number of times in order to capture any sufficient number of images (e.g., frames 352a1, 352a2, 352b1, 352b2, 354a1, 354a2, 354b1, 354b2) for any suitable image analysis purposes (e.g., indicia payload decoding, facial recognition, scan avoidance detection, etc.).

Moreover, it should be appreciated that the exemplary activation sequences described herein are for the purposes of discussion only, and that the shared illumination source 206 and imaging apparatuses 202, 204 and corresponding imaging sensors 202b, 204b may activate in any suitable combination(s) of the image capture durations and/or exposure periods discussed herein.

Figure 4:
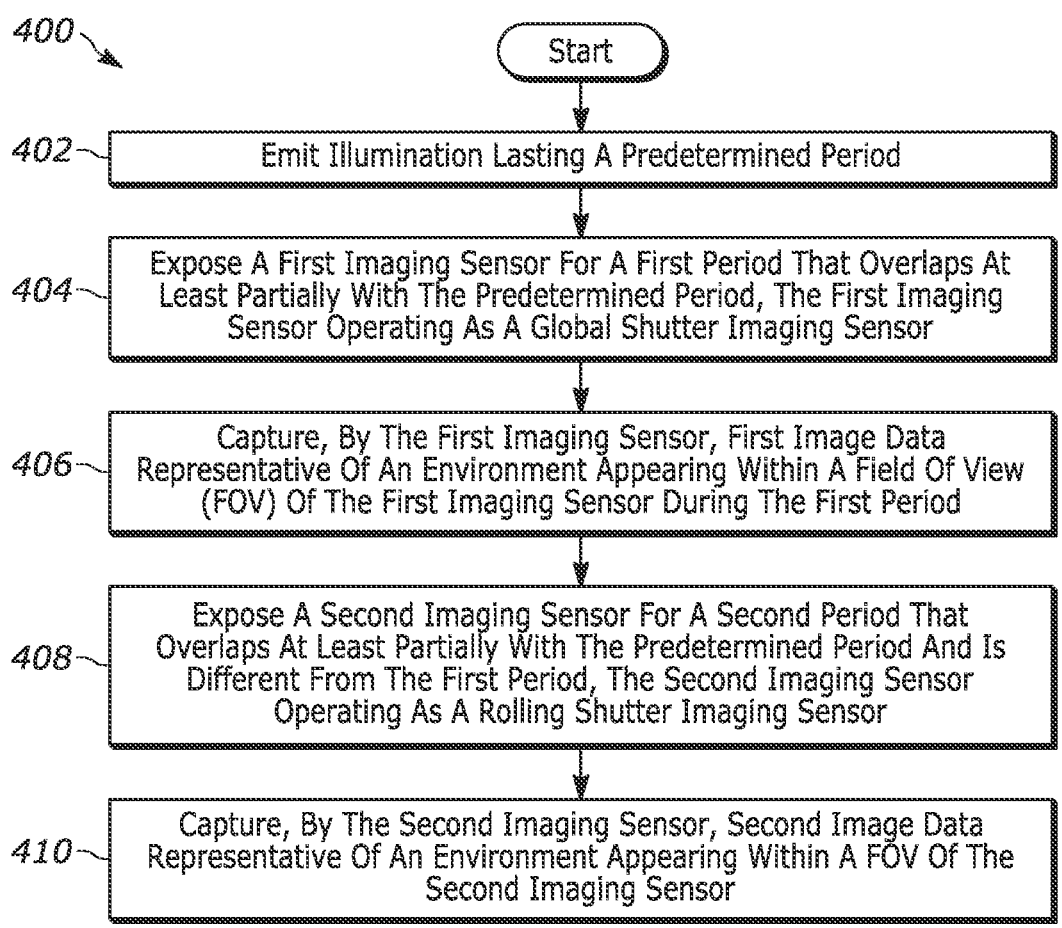
FIG. 4 illustrates an example method for capturing image data by a first imaging sensor and a second imaging sensor using illumination emitted by an illumination source, in accordance with embodiments disclosed herein.

FIG. 4 illustrates an example method 400 for capturing image data by a first imaging sensor and a second imaging sensor using illumination emitted by an illumination source, in accordance with embodiments disclosed herein. The method 400 includes emitting illumination lasting a predetermined period (block 402). The illumination pulse may be emitted by an illumination source (e.g., illumination source 206), and in certain embodiments, the illumination source may be configured to emit an illumination pulse that provides illumination lasting the predetermined period.

The method 400 further includes exposing a first imaging sensor for a first period that overlaps at least partially with the predetermined period, where the first imaging sensor operates as a global shutter imaging sensor (block 404). In certain embodiments, an initial exposure of the first imaging sensor may be within 2 milliseconds (ms) of a beginning of the predetermined period, and an initial exposure of the second imaging sensor may be within 2 ms of an end of the first period.

The method 400 further includes capturing, by the first imaging sensor, first image data representative of an environment appearing within a field of view (FOV) of the first imaging sensor during the first period (block 406). In some embodiments, a first sensor readout period of the first imaging sensor and a second sensor readout period of the second imaging sensor take place at least partially within the predetermined period.

The method 400 further includes exposing a second imaging sensor for a second period that overlaps at least partially with the predetermined period and is different from the first period, where the second imaging sensor operates as a rolling shutter imaging sensor (block 408). In certain embodiments, the second period at least partially overlaps with the first period (e.g., the second exposure period 344a overlapping partially with the first exposure period 342a of FIG. 3E). In some embodiments, the second period corresponds with a central period of the predetermined period that does not include the first period (e.g., the second exposure period 324a and the fourth exposure period 324b of FIG. 3C).

In some embodiments, the first period begins within 2 milliseconds (ms) of the second period, the FOV of the second imaging sensor is larger than the FOV of the first imaging sensor, and a portion of the emitted illumination is clipped to avoid illuminating a set of initially exposed sensor rows of the second imaging sensor that are along an edge of the FOV of the second imaging sensor. For example, the illumination source may include at least one of a baffle or a field stop that is configured to clip the emitted illumination, and/or the illumination source may be configured to limit the illumination pulse so that it does not occur during an initial portion of the second period.

In certain embodiments, the first period begins within 2 milliseconds (ms) of an end of the second period, the FOV of the second imaging sensor is larger than the FOV of the first imaging sensor, and a portion of the emitted illumination is clipped to avoid illuminating a set of finally exposed sensor rows of the second imaging sensor that are along an edge of the FOV of the second imaging sensor. Similar to the prior embodiments, the illumination source may include at least one of a baffle or a field stop that is configured to clip the emitted illumination, and/or the illumination source may be configured to limit the illumination pulse so that it does not occur during a final portion of the second period.

The method 400 further includes capturing, by the second imaging sensor, second image data representative of an environment appearing within a FOV of the second imaging sensor (block 410). In some embodiments, a beginning of a subsequent image data capture of the first imaging sensor is within 2 milliseconds (ms) of an end of the second period (e.g., third exposure period 332b of FIG. 3D).

In certain embodiments, a first imaging apparatus that includes the first imaging sensor may receive a delay signal to delay exposure of the first imaging sensor until the second imaging sensor is not exposed. For example, the first imaging apparatus may receive this delay signal in response (or as a result of) the second period ending at least partially outside of the predetermined period.

In some embodiments, the second imaging sensor is further configured to capture subsequent image data representative of the environment appearing within the FOV of the second imaging sensor during a subsequent period that is different from the second period, the second imaging sensor operating as a global shutter imaging sensor during the subsequent period. For example, as illustrated in FIG. 3D, the second imaging sensor operates as a rolling shutter imaging sensor during a second exposure period 334a, and the second imaging sensor operates as a global shutter imaging sensor during a fourth exposure period 334b.

In certain embodiments, the first period begins within 2 milliseconds (ms) of the second period, and image data captured by a set of initially exposed sensor rows of the second imaging sensor is discarded during a second imaging sensor readout period within the predetermined period.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging system for reading and/or decoding indicia, the imaging system comprising:
 an illumination source configured to emit illumination lasting a predetermined period;
 a first imaging sensor configured to capture first image data representative of an environment appearing within a field of view (FOV) of the first imaging sensor during a first period that overlaps at least partially with the predetermined period, the first imaging sensor operating as a global shutter imaging sensor; and
 a second imaging sensor configured to capture second image data representative of an environment appearing within a FOV of the second imaging sensor during a second period that overlaps at least partially with the predetermined period and is different from the first period, the second imaging sensor operating as a rolling shutter imaging sensor.

2. The imaging system of claim 1, wherein an initial exposure of the first imaging sensor is within 2 milliseconds (ms) of a beginning of the predetermined period, and an initial exposure of the second imaging sensor is within 2 ms of an end of the first period.

3. The imaging system of claim 1, wherein a first sensor readout period of the first imaging sensor and a second sensor readout period of the second imaging sensor take place at least partially within the predetermined period.

4. The imaging system of claim 1, wherein a beginning of a subsequent image data capture of the first imaging sensor is within 2 milliseconds (ms) of an end of the second period.

5. The imaging system of claim 1, further comprising:
a first imaging apparatus that includes the first imaging sensor, and
wherein, responsive to the second period ending at least partially outside of the predetermined period, the first imaging apparatus receives a delay signal to delay exposure of the first imaging sensor until the second imaging sensor is not exposed.

6. The imaging system of claim 1, wherein the second imaging sensor is further configured to capture subsequent image data representative of the environment appearing within the FOV of the second imaging sensor during a subsequent period that is different from the second period, the second imaging sensor operating as a global shutter imaging sensor during the subsequent period.

7. The imaging system of claim 1, wherein the second period at least partially overlaps with the first period.

8. The imaging system of claim 1, wherein the second period corresponds with a central period of the predetermined period that does not include the first period.

9. The imaging system of claim 1, wherein the first period begins within 2 milliseconds (ms) of the second period, and image data captured by a set of initially exposed sensor rows of the second imaging sensor is discarded during a second imaging sensor readout period within the predetermined period.

10. The imaging system of claim 1, wherein the first period begins within 2 milliseconds (ms) of the second period, the FOV of the second imaging sensor is larger than the FOV of the first imaging sensor, and a portion of the emitted illumination is clipped to avoid illuminating a set of initially exposed sensor rows of the second imaging sensor that are along an edge of the FOV of the second imaging sensor.

11. The imaging system of claim 1, wherein the first period begins within 2 milliseconds (ms) of an end of the second period, the FOV of the second imaging sensor is larger than the FOV of the first imaging sensor, and a portion of the emitted illumination is clipped to avoid illuminating a set of finally exposed sensor rows of the second imaging sensor that are along an edge of the FOV of the second imaging sensor.

12. A tangible machine-readable medium comprising instructions for reading and/or decoding indicia that, when executed, cause a machine to at least:
emit illumination lasting a predetermined period;
expose a first imaging sensor for a first period that overlaps at least partially with the predetermined period, the first imaging sensor operating as a global shutter imaging sensor;
capture, by the first imaging sensor, first image data representative of an environment appearing within a field of view (FOV) of the first imaging sensor during the first period;
expose a second imaging sensor for a second period that overlaps at least partially with the predetermined period and is different from the first period, the second imaging sensor operating as a rolling shutter imaging sensor; and
capture, by the second imaging sensor, second image data representative of an environment appearing within a FOV of the second imaging sensor.

13. The tangible machine-readable medium of claim 12, wherein the instructions, when executed, further cause the machine to at least:
begin exposing the first imaging sensor within 2 milliseconds (ms) of a beginning of the predetermined period; and
begin exposing the second imaging sensor within 2 ms of an end of the first period.

14. The tangible machine-readable medium of claim 12, wherein the instructions, when executed, further cause the machine to at least:
cause a first sensor readout period of the first imaging sensor and a second sensor readout period of the second sensor to take place at least partially within the predetermined period.

15. The tangible machine-readable medium of claim 12, wherein the instructions, when executed, further cause the machine to at least:
begin capturing, by the first imaging sensor, subsequent image data within 2 milliseconds (ms) of an end of the second period.

16. The tangible machine-readable medium of claim 12, wherein the instructions, when executed, further cause the machine to at least:
responsive to the second period ending at least partially outside of the predetermined period, delay exposure of the first imaging sensor until the second imaging sensor is not exposed.

17. The tangible machine-readable medium of claim 12, wherein the instructions, when executed, further cause the machine to at least:
cause the second imaging sensor to capture subsequent image data representative of the environment appearing within the FOV of the second imaging sensor during a subsequent period that is different from the second period, the second imaging sensor operating as a global shutter imaging sensor during the subsequent period.

18. The tangible machine-readable medium of claim 12, wherein the instructions, when executed, further cause the machine to at least:
expose the second imaging sensor at least partially during the first period, such that the second period at least partially overlaps with the first period.

19. The tangible machine-readable medium of claim 12, wherein the instructions, when executed, further cause the machine to at least:
expose the second imaging sensor such that the second period corresponds with a central period of the predetermined period that does not include the first period.

20. The tangible machine-readable medium of claim 12, wherein the instructions, when executed, further cause the machine to at least:
cause the first period to begin within 2 milliseconds (ms) of the second period; and
discard image data captured by a set of initially exposed sensor rows of the second imaging sensor during a second sensor readout period within the predetermined period.

* * * * *